United States Patent
Wu et al.

(10) Patent No.: US 8,412,264 B2
(45) Date of Patent: Apr. 2, 2013

(54) MOBILE COMMUNICATION DEVICE AND METHOD FOR TRANSCEIVING DATA AND VOICE THEREOF

(75) Inventors: Wei-Yang Wu, Taoyuan County (TW); Yen-Chuan Lin, Taoyuan County (TW); Wei-Chih Ku, Taoyuan County (TW); Chih-Wei Hsu, Taoyuan County (TW); Jiun-Nan Wu, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 49 days.

(21) Appl. No.: 13/052,125

(22) Filed: Mar. 21, 2011

(65) Prior Publication Data

US 2012/0172084 A1    Jul. 5, 2012

Related U.S. Application Data

(60) Provisional application No. 61/430,116, filed on Jan. 5, 2011.

(51) Int. Cl.
*H04W 88/06*    (2009.01)
(52) U.S. Cl. .................................................. 455/552.1
(58) Field of Classification Search .................. 455/75, 455/77, 73, 558, 557, 333, 129, 436, 435.1, 455/78, 88, 509, 562.1, 560, 561, 552.1, 455/553.1, 166.1, 575.1; 370/338, 341, 352, 370/350, 493, 503
See application file for complete search history.

(56) References Cited

U.S. PATENT DOCUMENTS

| | | | |
|---|---|---|---|
| 2005/0259011 A1* | 11/2005 | Vance | 343/702 |
| 2008/0146278 A1* | 6/2008 | Rofougaran | 455/557 |
| 2010/0056075 A1* | 3/2010 | Rakshani et al. | 455/77 |
| 2011/0014879 A1* | 1/2011 | Alberth et al. | 455/75 |

FOREIGN PATENT DOCUMENTS

| | | |
|---|---|---|
| EP | 0752735 | 1/1997 |
| EP | 1432067 | 6/2004 |
| JP | 3280625 | 12/1991 |
| JP | 2003163956 | 6/2003 |
| JP | 2004179995 | 6/2004 |
| WO | 0115267 | 3/2001 |

* cited by examiner

*Primary Examiner* — Melody Mehrpour
(74) *Attorney, Agent, or Firm* — Jianq Chyun IP Office (57) ABSTRACT

A mobile communication device and a method for transceiving data and voice thereof are proposed. The mobile communication device includes a receiver, a first antenna module, and a second antenna module. The receiver is used to output voice. The first antenna module is disposed in the mobile communication device at a first side close to the receiver, and is used to transceive data of a first wireless communication system or a second wireless communication system. The second antenna module is disposed at a second side opposite to the first side, and is used to transceive voice of the first wireless communication system. A first distance between the first antenna module and the receiver is less than a second distance between the second antenna module and the receiver.

12 Claims, 5 Drawing Sheets

MOBILE COMMUNICATION DEVICE AND METHOD FOR TRANSCEIVING DATA AND VOICE THEREOF

CROSS-REFERENCE TO RELATED APPLICATION

This application claims the priority benefits of U.S. provisional application Ser. No. 61/430,116, filed on Jan. 5, 2011. The entirety of the above-mentioned patent application is hereby incorporated by reference herein and made a part of this specification.

BACKGROUND

1. Field of the Invention

The subject application relates to a data transmission device and a method thereof. Particularly, the subject application relates to a mobile communication device and a method for transceiving data and voice simultaneously thereof.

2. Description of Related Art

A wireless communication device generally has a single antenna (i.e. a license band antenna). Regarding a thin handheld wireless communication device, the antenna is generally disposed at a lower pat of the wireless communication device to mitigate reduction of antenna radiation efficiency since the user's head is close to the wireless communication device when the user holds the wireless communication device to make a phone call.

However, besides a voice function, the wireless communication device is also developed towards a trend of high-speed wireless data transmission. When the user uses the wireless communication device for internet accessing (such as internet browsing, checking e-mails), the user generally holds the lower part of the wireless communication device by hand, and the user's palm may shield or cover the antenna located at the lower part of the wireless communication device, which may cause reduction of the antenna radiation efficiency.

Moreover, if the wireless communication device has only one antenna for transceiving voice and data, when the user makes a phone call, data transmission has to be stopped temporarily. Therefore, how to implement simultaneous voice and data (SVD) transceiving on the wireless communication device without reducing the antenna radiation efficiency and implement optimal antenna arrangement are important issues to be developed.

SUMMARY OF THE INVENTION

Accordingly, the subject application is directed to a mobile communication device and a method for transceiving data and voice thereof. By suitably arranging positions of two antenna modules, one of the antenna modules transceives data, and another antenna module only transceives voice, so as to achieve a function of simultaneously transceiving voice and data, and reduce influence of human body to antenna radiation efficiency.

The subject application provides a mobile communication device including a receiver, a first antenna module, and a second antenna module. The receiver is used to output voice. The first antenna module is disposed on the mobile communication device at a first side close to the receiver, and is used to transceive data of a first wireless communication system or a second wireless communication system. The second antenna module is disposed at a second side opposite to the first side, and is used to transceive voice of the first wireless communication system. A first distance between the first antenna module and the receiver is less than a second distance between the second antenna module and the receiver.

In an embodiment of the invention, the first antenna module is used to transceive data of the second wireless communication system, and when a received signal strength of the second wireless communication system is lower than a predetermined value, the first antenna module is changed to transceive data of the first wireless communication system.

In an embodiment of the invention, the second antenna module further receives data of the first wireless communication system or the second wireless communication system when the second antenna module does not transceive voice of the first wireless communication system.

In an embodiment of the invention, when the mobile communication device simultaneously transceives voice and data, the first antenna module transceives data of the first wireless communication system, and the second antenna module only transceives voice of the first wireless communication system.

In an embodiment of the invention, when the mobile communication device only transceives data, the first antenna module transceives data of the first wireless communication system, and the second antenna module dynamically assists the fist antenna module to receive data of the first wireless communication system.

In an embodiment of the invention, when the mobile communication device only transceives data, the first antenna module transceives data of the second wireless communication system, and the second antenna module dynamically assists the first antenna module to receive data of the second wireless communication system.

In an embodiment of the invention, the first wireless communication system is a wireless communication system supporting code division multiple access (CDMA) and evolution-data only (EVDO) wireless communication standards, and the second wireless communication system is a wireless communication system supporting a long term evolution (LTE) wireless communication standard.

In an embodiment of the invention, the first antenna module and the second antenna module are adapted to be operated at a frequency band of 850 MHz or 1900 MHz of the first wireless communication system or operated at a frequency band of 700 MHz of the second wireless communication system.

The subject application provides a method for transceiving voice and data, which is adapted to a mobile communication device. The above method includes following steps. A first antenna module disposed on the mobile communication device at a first side close to a receiver is used to transceive data of a first wireless communication system or a second wireless communication system. A second antenna module disposed at a second side opposite to the first side is used to transceive voice of the first wireless communication system. Where, a first distance between the first antenna module and the receiver is less than a second distance between the second antenna module and the receiver.

In an embodiment of the invention, the step of transceiving data of the first wireless communication system or the second wireless communication system by using the first antenna module disposed on the mobile communication device at the first side close to the receiver includes determining whether a signal strength of the second wireless communication system received by the first antenna module is lower than a predetermined value, where when the signal strength of the second wireless communication system is not lower than the predetermined value, the first antenna module is used to transceive data of the second wireless communication system, and when the signal strength of the second wireless communication system is lower than the predetermined value, the first antenna module is used to transceive data of the first wireless communication system.

In an embodiment of the invention, the method further includes determining whether to transceiver voice and when voice is transceived, the second antenna module is used to transceive voice of the first wireless communication system, and when voice is not transceived, the second antenna module is used to transceive data of the first wireless communication system or the second wireless communication system.

In an embodiment of the invention, the step of transceiving data of the first wireless communication system or the second wireless communication system by using the second antenna module includes transceiving data of the first wireless communication system by using the first antenna module, and dynamically assisting the first antenna module in receiving data of the first wireless communication system by using the second antenna module.

In an embodiment of the invention, the step of transceiving data of the first wireless communication system or the second wireless communication system by using the second antenna module includes transceiving data of the second wireless communication system by using the first antenna module, and dynamically assisting the first antenna module in receiving data of the second wireless communication system by using the second antenna module.

According to the above descriptions, in the mobile communication device of the subject application and the method for transceiving data and voice thereof, by suitably arranging positions of the first antenna module and the second antenna module, in which the first antenna module is used to transceive data, and the second antenna module is used to transceive voice. In this way, voice and data can be simultaneously transceived, and influence of human body to antenna irradiation efficiency can be reduced.

In order to make the aforementioned and other features and advantages of the subject application comprehensible, several exemplary embodiments accompanied with figures are described in detail below.

BRIEF DESCRIPTION OF THE DRAWINGS

The accompanying drawings are included to provide a further understanding of the subject application, and are incorporated in and constitute a part of this specification. The drawings illustrate embodiments of the invention and, together with the description, serve to explain the principles of the subject application.

DETAILED DESCRIPTION OF DISCLOSED EMBODIMENTS

The subject application provides a mobile communication device including at least two antenna modules, where one of the antenna modules is disposed at an upper part of the mobile communication device. For example, the antenna module is disposed close to a receiver or a camera module, though the subject application is not limited thereto. Another antenna module is disposed at a lower part of the mobile communication device, for example, a place apart from the receiver or the camera module, though the subject application is not limited thereto. The upper part and the lower part are defined according to a holding direction of the mobile communication device when a user holds the mobile communication device to make a phone call.

Further, the user may use the mobile communication device to make a phone call or transceive data. When the user makes a phone call, the user may habitually attach the receiver of the mobile communication device nearly to the head or ear for receiving voice, meanwhile the upper part of the mobile communication device closed to the receiver would be influenced by human body, for example, a phantom effect or a human body effect (specific absorption rate (SAR)). Comparatively, when the user uses the mobile communication device for wireless internet accessing (such as internet browsing or transceiving messages), the user generally holds the middle and lower part of the mobile communication device by hand, and now signals transceived by the antenna disposed at a side of the mobile communication device are shielded. Therefore, in the subject application, the antenna module disposed at the upper part of the mobile communication device is used to transceive data (data transmission) of the wireless communication system, and during a phone call, the other antenna module disposed at the lower part of the mobile communication device is used to transceive voice of the wireless communication system. Moreover, the subject application has a function of simultaneously transceiving voice and data, for example, while the user is making a phone call (the mobile communication device may be attached to the user's head or a hand-free mode is activated), the user can also browse or inquire data through a wireless network. In other words, while the antenna module disposed at the upper part of the mobile communication device is used to transceive data of the wireless communication system, the other antenna module disposed at the lower part of the mobile communication device is used to transceive voice of the wireless communication system. However, the subject application is not limited to the above implementation, and when the mobile communication device is only used for transceiving data, the antenna module disposed at the lower part of the mobile communication device can be used as an auxiliary antenna for dynamically receiving data (i.e. assisting in receiving data), which is referred to as a diversity antenna by those skilled in the art.

According to the above antenna arrangement and operation method, reduction of antenna efficiency caused by handholding when the user browse data and reduction of antenna efficiency since the user's head is close to the wireless communication device during a phone call can be mitigated. Moreover, since voice and data are respectively transceived through different antenna modules, during a data transmission process, when the phone call is made, it is unnecessary to pause the data transmission process.

Figure 1:
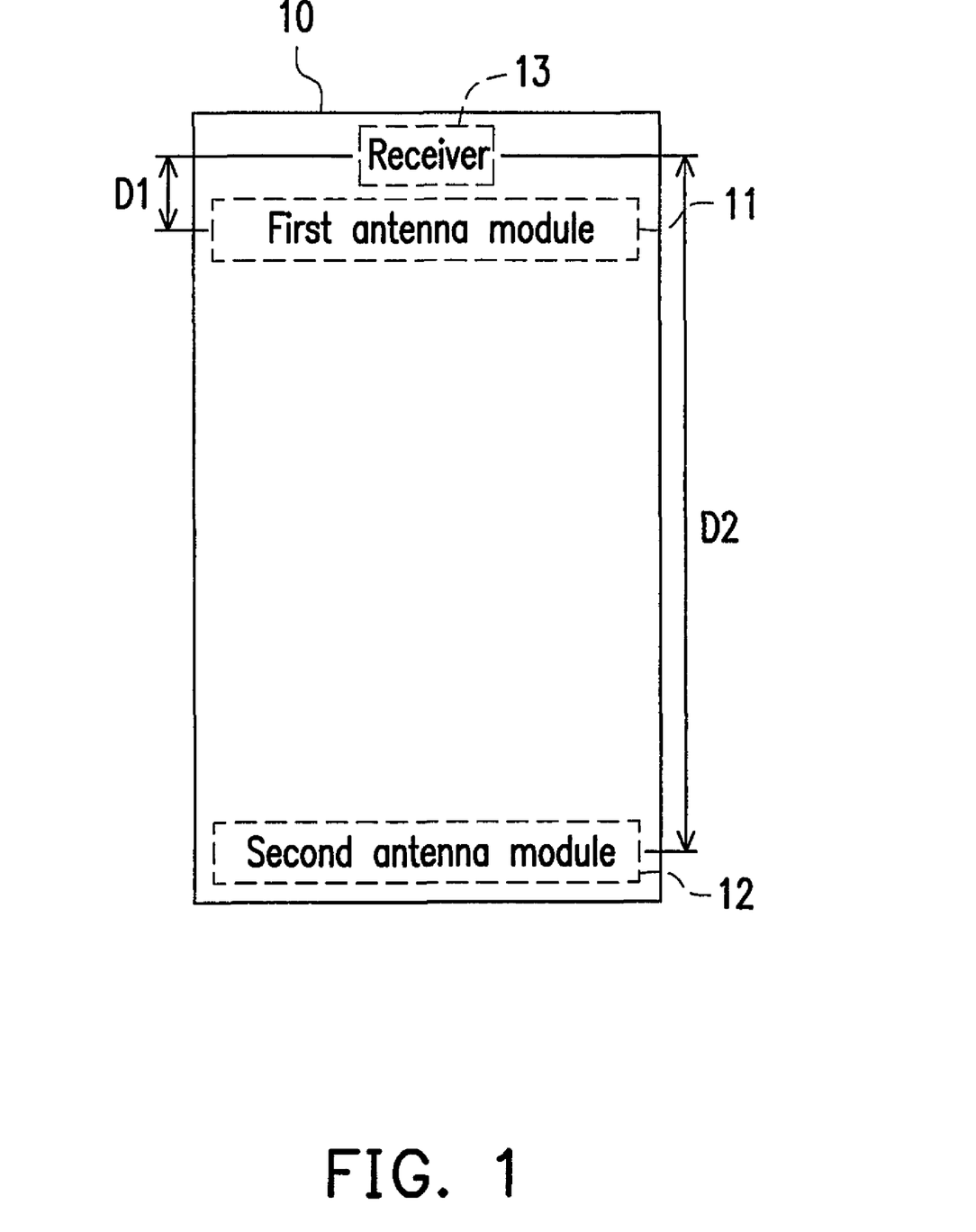
FIG. 1 is a schematic diagram of a mobile communication device according to an embodiment of the invention.

FIG. 1 is a schematic diagram of a mobile communication device 10 according to an embodiment of the invention. The mobile communication device 10 of the present embodiment is adapted to simultaneously transceive voice and data. The mobile communication device 10 is, for example, a mobile phone, a smart phone, a tablet, a multimedia player, a handheld game device, a handheld communication/processing device, a mobile navigator, a personal digital assistant (PDA) or a PDA phone, etc., which is not limited by the subject application.

Referring to FIG. 1, the mobile communication device 10 at least includes a first antenna module 11, a second antenna module 12, a receiver 13 and other necessary components, for example, a camera module, a display module, a battery module, and an input module, etc. Where, the receiver 13 is used to output voice, and serves as a sound output device of the mobile communication device 10. As shown in FIG. 1, the first antenna module 11 is disposed on the mobile communication device 10 at a first side close to the receiver 13, i.e. an upper part of the mobile communication device 10 of FIG. 1. The first antenna module 11 is used to transceive data of a first wireless communication system or a second wireless communication system. For example, the first antenna module 11 can be applied to data transmission bands of long term evolution (LTE), worldwide interoperability for microwave access (WiMAX), evolution-data only (EVDO) technique of code division multiple access (CDMA), a packet switching (PS) system of a universal mobile telecommunications system (UMTS), enhanced data rates for global evolution (EDGE), and general packet radio service (GPRS), etc.

The second antenna module 12 is disposed at a second side opposite to the first side, i.e. a lower part of the mobile communication device 10 of FIG. 1. The second antenna module 12 is used to transceive voice of the first wireless communication system, and when the voice is not transceived, the second antenna module 12 can be used to dynamically assist the first antenna module 11 to receive data of the first wireless communication system or the second wireless communication system. Where, a distance D1 between the first antenna module 11 and the receiver 13 is less than a distance D2 between the second antenna module 12 and the receiver 13, which represents that the second antenna module 12 is far away from the receiver 13. In this way, when the user makes a phone call, the received voice signal is not influenced by the phantom effect. For example, the second antenna module 12 can be used for voice band of CDMA, circuit switching (CS) of UMTS, and global system for mobile communications (GSM), etc.

In the present embodiment, the first wireless communication system is a wireless communication system supporting a CDMA2000 1x version wireless communication standard, where "1x" refers to a CDMA2000 wireless technique using a pair of 1.25 MHz wireless channels. In the following descriptions, CDMA is used to represent the circuit switching technique of transceiving voice in the CDMA2000 standard.

Moreover, the first wireless communication system further supports the wireless communication standard of EVDO of the CDMA2000 version. In the following descriptions, EVDO is used to represent the packet switching (PS) technique of transceiving data in the CDMA2000 standard. The CDMA and EVDO are all $3^{rd}$ generation mobile communication system (3G) standards.

On the other hand, the second wireless communication system is a wireless communication system supporting a wireless communication standard of LTE of a $3^{rd}$ generation partnership project (3GPP). In the following descriptions, LTE is used to represent the 3GPP LTE standard. The LET is a $4^{th}$ generation mobile communication system standard.

In the above embodiment, when the mobile communication device 10 simultaneously transceives voice and data, the first antenna module 11 is used for transceiving data of the first wireless communication system or the second wireless communication system, and the second antenna module 12 is only used for transceiving voice of the first wireless communication system. Where, the first antenna module 11 and the second antenna module 12 are capable of operating at a frequency band of 850/900 MHz or 1800/1900 MHz of the first wireless communication system or operating at a frequency band of 700 MHz of the second wireless communication system.

In detail, in a first operation state of a first embodiment, the first antenna module 11 and the second antenna module 12 are both operated at frequency bands of 850 MHz and 1900 MHz of the first wireless communication system. In a second operation state of the first embodiment, the first antenna module 11 and the second antenna module 12 are both operated at a frequency band of 700 MHz of the second wireless communication system. In a third operation state of the first embodiment, the first antenna module 11 is operated at a frequency band of 700 MHz of the second wireless communication system, and the second antenna module 12 is operated at frequency bands of 850 MHz and 1900 MHz of the first wireless communication system.

In the present embodiment, the mobile communication device 10 further includes a single-chip packaged wireless communication module (not shown), and such wireless communication module at least simultaneously supports the CDMA, EVDO, UMTS, GSM and LTE wireless communication standards. Moreover, since such wireless communication module simultaneously supports the wireless communication standards such as CDMA, EVDO and LTE, the mobile communication device 10 can implement various voice and data transmission modes and corresponding configurations thereof of a following table 1. A plurality of combination modes for transceiving voice and data is described below with reference of the table 1.

TABLE 1

| Mode | Configuration |
| --- | --- |
| 1 | CDMA(850 MHz)voice + EVDO(850 MHz)data |
| 2 | CDMA(850 MHz)voice + EVDO(1900 MHz)data |
| 3 | CDMA(850 MHz)voice + LTE(700 MHz)data |
| 4 | CDMA(1900 MHz)voice + EVDO(850 MHz)data |
| 5 | CDMA(1900 MHz)voice + EVDO(1900 MHz)data |
| 6 | CDMA(1900 MHz)voice + LTE(700 MHz)data |

In the mode 1, the second antenna module 12 of the mobile communication device 10 transceives voice of CDMA (operated at a frequency band of 850 MHz), and the first antenna module 11 transceives data of EVDO (operated at the frequency band of 850 MHz). In the mode 2, the second antenna module 12 of the mobile communication device 10 also transceives voice of CDMA (operated at the frequency band of 850 MHz), and the first antenna module 11 transceives data of EVDO (operated at a frequency band of 1900 MHz). In the mode 3, the second antenna module 12 of the mobile communication device 10 also transceives voice of CDMA (operated at the frequency band of 850 MHz), and the first antenna module 11 transceives data of LTE (operated at a frequency band of 700 MHz).

In the mode 4, the second antenna module 12 of the mobile communication device 10 transceives voice of CDMA (operated at the frequency band of 1900 MHz), and the first antenna module 11 transceives data of EVDO (operated at the frequency band of 850 MHz). In the mode 5, the second antenna module 12 of the mobile communication device 10 also transceives voice of CDMA (operated at the frequency band of 1900 MHz), and the first antenna module 11 transceives data of EVDO (operated at the frequency band of 1900 MHz). In the mode 6, the second antenna module 12 of the mobile communication device 10 also transceives voice of CDMA (operated at the frequency band of 1900 MHz), and the first antenna module 11 transceives data of LTE (operated at a frequency band of 700 MHz).

It should be noticed that in other embodiments of the invention, the first antenna module 11 and the second antenna module 12 may further support other wireless communication standards. For example, the first antenna module 11 may support wireless communication standards of CDMA 2000 1x radio transmission technique (RTT), packet switching (PS) system of UMTS, and EDGE, etc. The second antenna module 12 may support wireless communication standards of CDMA 2000 1xRTT, UMTS CS system, and GSM, etc.

On the other hand, in the other embodiments of the invention, in case that the second antenna module 12 used for transceiving voice of CDMA in the mobile communication device 10 does not receive voice, it can dynamically assist the first antenna module 11 in receiving data of EVDO or LTE. Moreover, besides the first antenna module 11 and the second antenna module 12, the mobile communication device 10 may further include an antenna (not shown) for a wireless local area network (WLAN) and an antenna (not shown) for bluetooth. The WLAN technique used by the mobile communication device 10 is, for example, any wireless communication network, system, apparatus, device and method, etc. based on the IEEE 802.11 a/b/g/n standard, and the antenna supporting such technique is, for example, operated at a frequency band of 2.45 MHz. A plurality of combination modes for transceiving voice and data are described below with reference to table 2.

TABLE 2

| Mode | Configuration |
|---|---|
| 1 | CDMA(850 MHz)voice + EVDO(850 MHz)data + WLAN/Bluetooth |
| 2 | CDMA(850 MHz)voice + EVDO(1900 MHz)data + WLAN/Bluetooth |
| 3 | CDMA(850 MHz)voice + LTE(700 MHz)data + WLAN/Bluetooth |
| 4 | CDMA(1900 MHz)voice + EVDO(850 MHz)data + WLAN/Bluetooth |
| 5 | CDMA(1900 MHz)voice + EVDO(1900 MHz)data + WLAN/Bluetooth |
| 6 | CDMA(1900 MHz)voice + LTE(700 MHz)data + WLAN/Bluetooth |
| 7 | CDMA (850 MHz)voice + WLAN/Bluetooth |
| 8 | CDMA (1900 MHz)voice + WLAN/Bluetooth |
| 9 | EVDO(850 MHz)data + WLAN/Bluetooth |
| 10 | CDMA (1900 MHz)data + WLAN/Bluetooth |
| 11 | LTE(700 MHz)data + WLAN/Bluetooth |

In the mode 1-6, functions of the first antenna module 11 and the second antenna module 12 of the mobile communication device 10 are the same as those of the table 1, so that detailed descriptions thereof are not repeated. It should be noticed that in the above mode 7, the mobile communication device 10 does not transceive data, and meanwhile only the second antenna module 12 transceives voice of CDMA (respectively operated at the frequency bands of 850 MHz and 1900 MHz). In the mode 9, the mobile communication device 10 does not transceive voice, and meanwhile besides the first antenna module 11 receives data of EVDO (operated at the frequency band of 850 MHz), the second antenna module 12 may dynamically assist the first antenna module 11 in receiving data of EVDO. In the mode 10, the mobile communication device 10 does not transceive voice, and meanwhile besides the first antenna module 11 receives data of CDMA (operated at the frequency band of 1900 MHz), the second antenna module 12 may dynamically assist the first antenna module 11 in receiving data of CDMA. In the mode 11, the mobile communication device 10 does not transceive voice, and meanwhile besides the first antenna module 11 receives data of LTE (operated at the frequency band of 700 MHz), the second antenna module 12 may dynamically assist the first antenna module 11 in receiving data of LTE.

It should be noticed that in the modes 1-11 of the table 2, the mobile communication device 10 can also use a WiFi antenna or a bluetooth antenna to transceive data. The above two antennas are not illustrated in the figures, though the two antennas can be suitably arranged in the mobile communication device 10 by those skilled in the art, and detailed descriptions thereof are not repeated. Switching of the above modes, i.e. whether the mobile communication device 10 uses EVDO or LTE to transceive data is determined according to a wireless channel status, a system setting and environment. The wireless channel status is, for example, signal receiving quality, a signal to interference-plus-noise ratio (SINR) and a signal strength, etc., which may influence whether the EVDO or LTE is used to transceive data. Moreover, when the mobile communication device 10 is capable of connecting to an access point of the WLAN, the mobile communication device 10 may use the WLAN to transceive data in priority.

According to the allocation method of the first antenna module 11 and the second antenna module 12 and the supported wireless communication standards, how the mobile communication device 10 simultaneously transceives voice and data is described below with reference of FIG. 2, FIG. 3 and FIG. 4. Moreover, a method for transceiving data and voice is introduced with reference to FIG. 5.

Figure 2:
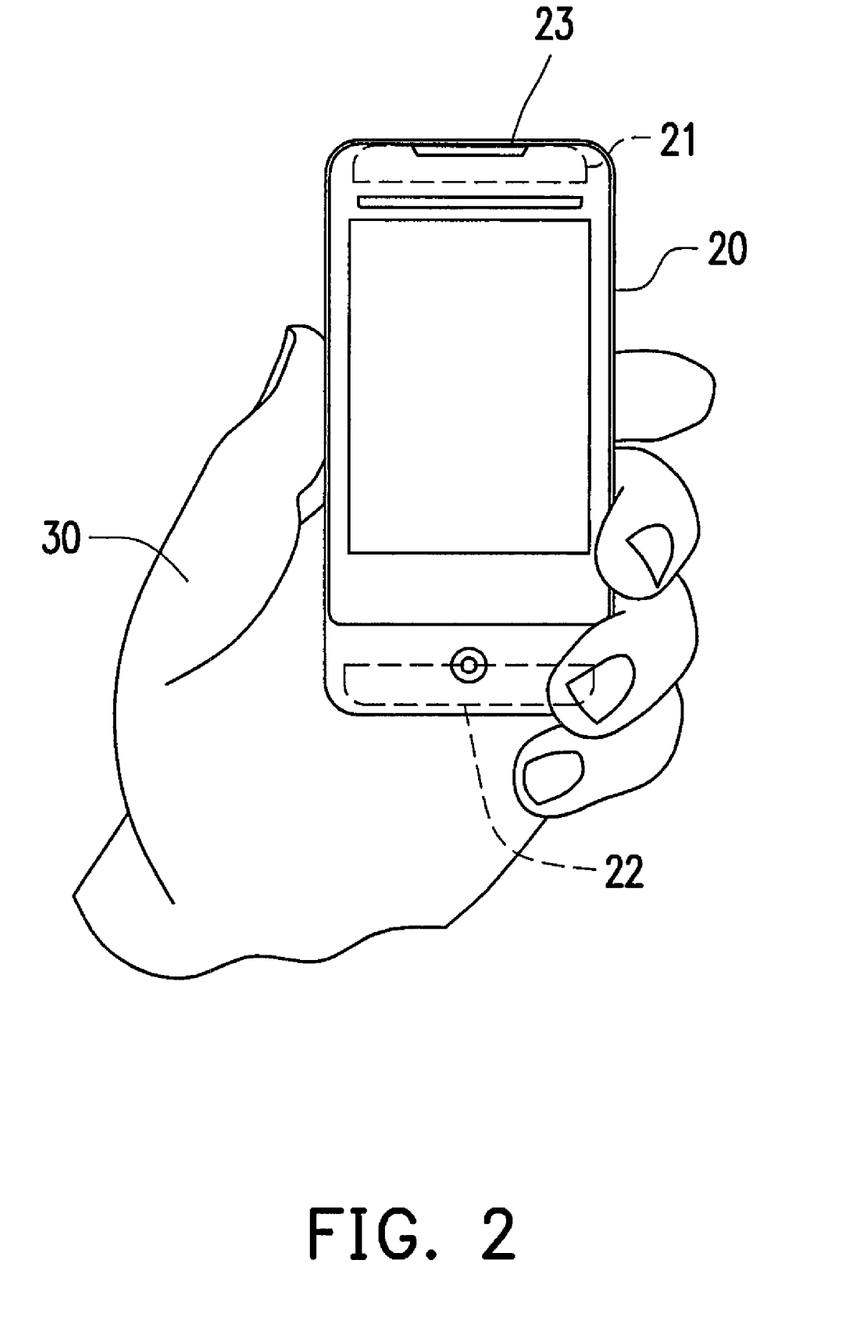
FIG. 2 is a schematic diagram illustrating a situation that a user holds a mobile communication device for Internet browsing.

FIG. 2 is a schematic diagram illustrating a situation that a user holds a mobile communication device for internet accessing. Referring to FIG. 2, when the user operates the mobile communication device 20 to browse and transceive data, the user's hand 30 is liable to tightly hold the mobile communication device 20, in which the palm is close to a second antenna module 22 located at a lower part of the mobile communication device 20, but the palm is obviously apart from a first antenna module 21 located at an upper part of the mobile communication device 20. Therefore, when the user only operates the mobile communication device 20 to transceive data (for example, browsing websites or checking emails) without making a phone call, the first antenna module 21 serves as a main antenna to transceive data, and the second antenna module 22 serves as a diversity antenna or a second receiving antennal for trasnsceiving data. Therefore, by disposing the first antenna module 21 at the upper part of the mobile communication device 20, influence of the user's hand 30 to the signal transceiving effect of the antenna can be effectively reduced.

Figure 3:
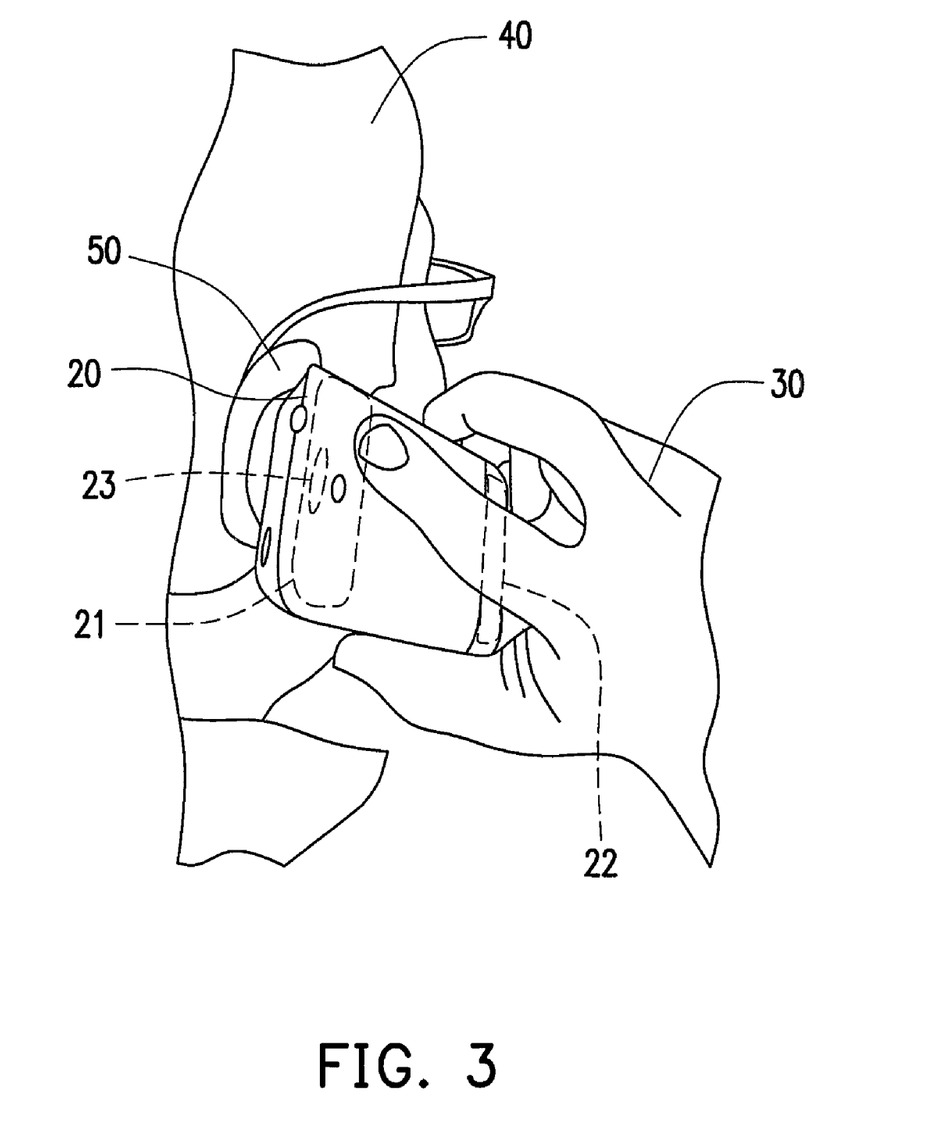
FIG. 3 is a schematic diagram illustrating a situation that a user holds a mobile communication device to make a phone call.

FIG. 3 is a schematic diagram illustrating a situation that a user holds a mobile communication device to make a phone call. As shown in FIG. 3, when the user holds the mobile communication device 20 to make a phone call, the user holds the mobile communication device 20 in a relaxed approach. When the user holds the mobile communication device 20 to a side of the user's head 40 for making the phone call through a voice output device (i.e. a receiver 23), the user's head 40 is close to the first antenna module 21 disposed near the receiver 23. When the user's ear 50 is closely attached to the voice output device of the mobile communication device 20, if the first antenna module 21 disposed at the upper part of the mobile communication device 20 is still used to transceive voice, the user's head 40 may severely influence a specific absorption rate (SAR) of radiation energy of the mobile communication device 20. Accordingly, in the subject application, the second antenna module 22 used for transceiving voice is disposed at the lower part of the mobile communication device 20 to avoid the above disadvantage.

Therefore, in the subject application, the second antenna module 22 used for transceiving voice is disposed at the lower part of the mobile communication device 20, i.e., at a position away from the voice output device (or the receiver 23). When the user makes a phone call, only a part of the user's fingers contacts the mobile communication device 20, and a gap is formed between the palm and the mobile communication device 20. According to FIG. 3, it is known that the user's hand 30 only covers a small part of the second antenna module 22. Therefore, by disposing the second antenna module 22 at the lower part of the mobile communication device 20, influence of the user's hand 30 and the user's head 40 to the voice transceiving antenna can be effectively reduced.

If the user simultaneously uses the mobile communication device 20 to make a phone call and transceive data, and holds the mobile communication device 20 in a manner as shown in FIG. 2, influence of the user's head 40 to the antenna efficiency of the second antenna module 22 used for transceiving voice is reduced, and influence of the user's hand 30 and the user's head 40 to the antenna efficiency of the first antenna module 21 used for transceiving data is more less. In case of another operation status, for example, the user makes the phone call in a hand-free mode while browsing and inquiring data through a wireless network, in other words, the first antenna module 21 located at the upper part of the mobile communication device 20 is used to transceive data of the wireless communication system, and meanwhile the second antenna module 22 located at the lower part of the mobile communication device 20 is used to transceive voice of the wireless communication system. Obviously, in case of the hand-free mode, the user's head 40 is already far away from the first antenna module 21 and the second antenna module 22, which almost has none influence on the antenna efficiency, and now only the user's hand 30 slightly influences the second antenna module 22 used for transceiving voice. Since a gap is formed between the palm and the mobile communication device 20, the mobile communication device 20 of the subject application can simultaneously transceive voice and data, and effectively reduce influence of human body on the antenna irradiation effect.

Figure 4:
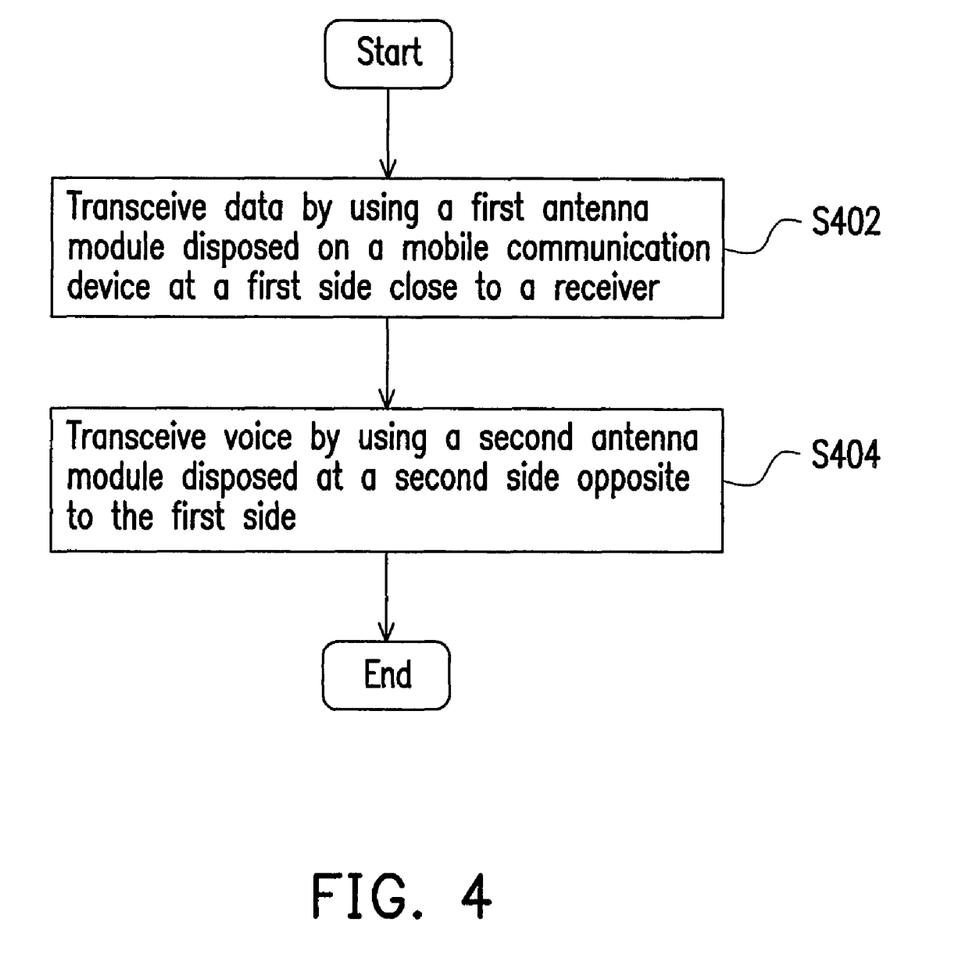
FIG. 4 is a flowchart illustrating a method for transceiving voice and data according to an embodiment of the invention.

FIG. 4 is a flowchart illustrating a method for transceiving voice and data according to an embodiment of the invention. Referring to FIG. 1 and FIG. 4, the method of the embodiment is adapted to the mobile communication device 10 of FIG. 1. Detailed steps of the method of the present embodiment are described below with reference to various components of FIG. 1.

First, in step S402, the first antenna module 11 disposed on the mobile communication device 10 at a first side close to the receiver 13 is used to transceive data of a first wireless communication system or a second wireless communication system. In step S404, the second antenna module 12 disposed at a second side opposite to the first side is used to transceive voice of the first wireless communication system.

In an actual application, when the mobile communication device 10 simultaneously transceives voice and data, the first antenna module 11 is used to transceive data of the first wireless communication system or the second wireless communication system, and the second antenna module 12 is used to transceive voice of the first wireless communication system. Further, when the mobile communication device 10 simultaneously transceives voice and data, the first antenna module 11 of the mobile communication device 10 is used to transceive data of the first wireless communication system, and the second antenna module 12 is used to transceive voice of the first wireless communication system.

Alternatively, when the mobile communication device 10 simultaneously transceives voice and data, the first antenna module 11 of the mobile communication device 10 is used to transceive data of the second wireless communication system, and the second antenna module 12 is used to transceive voice of the first wireless communication system.

It should be noticed that when the mobile communication device 10 transceives data without transceiving voice, the mobile communication device 10 uses the first antenna module 11 to transceive data of the first wireless communication system or the second wireless communication system, and uses the second antenna module 12 to dynamically assist the first antenna module 11 in receiving data of the first wireless communication system or the second wireless communication system.

Figure 5:
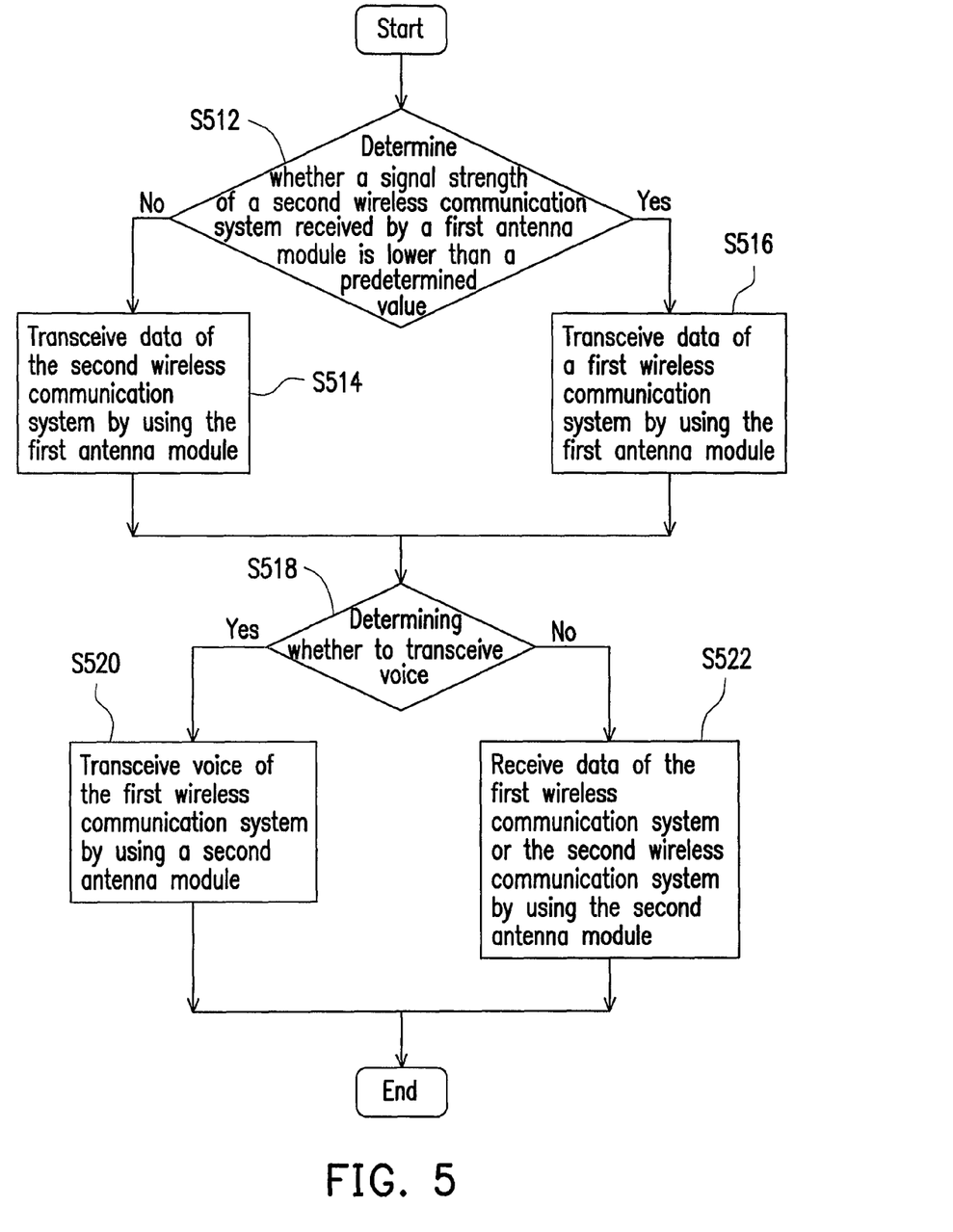
FIG. 5 is a flowchart illustrating a method for transceiving voice and data according to an embodiment of the invention.

In detail, FIG. 5 is a flowchart illustrating a method for transceiving voice and data according to an embodiment of the invention. Referring to FIG. 1 and FIG. 5, the method of the embodiment is adapted to the mobile communication device 10 of FIG. 1. Detailed steps of the method of the present embodiment are described below with reference to various components of FIG. 1.

First, in step S512, the mobile communication device 10 determines whether a signal strength of the second wireless communication system received by the first antenna module 11 is lower than a predetermined value, where the predetermined value of the signal strength is, for example, −100 dBm. If the signal strength of the second wireless communication system received by the first antenna module 11 is not lower than the predetermined value, a step S514 is executed, by which the first antenna module 11 is used to transceive data of the second wireless communication system. Comparatively, if the signal strength of the second wireless communication system received by the first antenna module 11 is lower than the predetermined value, a step S516 is executed, by which the first antenna module 11 is used to transceive data of the first wireless communication system. In brief, the mobile communication device 10 first attempts to transceive signals of the $4^{th}$ generation mobile communication system (4G) standard with faster data transmission rate, and changes to transceive signals of the 3G standard when the provided strength of the 4G standard does not reach a predetermined level.

Then, in step S518, the mobile communication device 10 determines whether voice is required to be transceived, and if the mobile communication device 10 requires to transceive voice, in step S520, the mobile communication device 10 uses the second antenna module 12 to transceive voice of the first wireless communication system. Comparatively, if the mobile communication device 10 does not require to transceive voice, in step S522, the mobile communication device 10 uses the second antenna module 12 to dynamically assist the first antenna module 11 in receiving data of the first wireless communication system or the second wireless communication system.

In summary, in the mobile communication device of the subject application and the method for transceiving data and voice thereof, by suitably arranging positions of the first antenna module and the second antenna module, influence of human body on the antenna used for receiving voice signals can be reduced, and a function of simultaneously transceiving voice and data is achieved.

It will be apparent to those skilled in the art that various modifications and variations can be made to the structure of the subject application without departing from the scope or spirit of the subject application. In view of the foregoing, it is intended that the subject application cover modifications and variations of this subject application provided they fall within the scope of the following claims and their equivalents.

What is claimed is:

1. A mobile communication device, adapted to transceive voice and data, the mobile communication device comprising:
   a receiver, configured to output voice;
   a first antenna module, disposed on the mobile communication device at a first side close to the receiver, configured to transceive data of a first wireless communication system or a second wireless communication system; and
   a second antenna module, disposed at a second side opposite to the first side, configured to transceive voice of the first wireless communication system, wherein a first distance between the first antenna module and the receiver is less than a second distance between the second antenna module and the receiver,
   wherein the first antenna module and the second antenna module are adapted to be operated at a frequency band of 850/900 MHz or 1800/1900 MHz of the first wireless communication system or operated at a frequency band of 700 MHz of the second wireless communication system.

2. The mobile communication device as claimed in claim 1, wherein the first antenna module is configured to transceive data of the second wireless communication system, and when a received signal strength of the second wireless communication system is lower than a predetermined value, the first antenna module is changed to transceive data of the first wireless communication system.

3. The mobile communication device as claimed in claim 1, wherein the second antenna module further receives data of the first wireless communication system or the second wireless communication system when the second antenna module does not transceive voice of the first wireless communication system.

4. The mobile communication device as claimed in claim 1, wherein when the mobile communication device only transceives data, the first antenna module transceives data of the first wireless communication system, and the second antenna module dynamically assists the first antenna module to receive data of the first wireless communication system.

5. The mobile communication device as claimed in claim 1, wherein when the mobile communication device only transceives data, the first antenna module transceives data of the second wireless communication system, and the second antenna module dynamically assists the first antenna module to receive data of the second wireless communication system.

6. The mobile communication device as claimed in claim 1, wherein the first wireless communication system is a wireless communication system supporting code division multiple access (CDMA) and evolution-data only (EVDO) wireless communication standards, and the second wireless communication system is a wireless communication system supporting a long term evolution (LTE) wireless communication standard.

7. A method for transceiving voice and data, adapted to a mobile communication device having a receiver, the method comprising:
   transceiving data of a first wireless communication system or a second wireless communication system by using a first antenna module disposed on the mobile communication device at a first side close to the receiver; and
   transceiving voice of the first wireless communication system by using a second antenna module disposed at a second side opposite to the first side, wherein a first distance between the first antenna module and the receiver is less than a second distance between the second antenna module and the receiver,
   wherein the first antenna module and the second antenna module are adapted to be operated at the frequency band of 850/900 MHz or 1800/1900 MHz of the first wireless communication system or operated at a frequency band of 700 MHz of the second wireless communication system.

8. The method for transceiving voice and data as claimed in claim 7, wherein the step of transceiving data of the first wireless communication system or the second wireless communication system by using the first antenna module disposed on the mobile communication device at the first side close to the receiver comprises:
   determining whether a signal strength of the second wireless communication system received by the first antenna module is lower than a predetermined value;
   transceiving data of the second wireless communication system by using the first antenna module when the signal strength of the second wireless communication system is not lower than the predetermined value; and
   transceiving data of the first wireless communication system by using the first antenna module when the signal strength of the second wireless communication system is lower than the predetermined value.

9. The method for transceiving voice and data as claimed in claim 7, further comprising:
   determining whether to transceive voice;
   transceiving voice of the first wireless communication system by using the second antenna module when transceiving voice; and
   transceiving data of the first wireless communication system or the second wireless communication system by using the second antenna module when not transceiving voice.

10. The method for transceiving voice and data as claimed in claim 9, wherein the step of transceiving data of the first wireless communication system or the second wireless communication system by using the second antenna module comprises:
    transceiving data of the first wireless communication system by using the first antenna module; and
    dynamically assistting the first antenna module in receiving data of the first wireless communication system by using the second antenna module.

11. The method for transceiving voice and data as claimed in claim 9, wherein the step of transceiving data of the first wireless communication system or the second wireless communication system by using the second antenna module comprises:
    transceiving data of the second wireless communication system by using the first antenna module; and
    dynamically assistting the first antenna module in receiving data of the second wireless communication system by using the second antenna module.

12. The method for transceiving voice and data as claimed in claim 7, wherein the first wireless communication system is a wireless communication system supporting code division multiple access (CDMA) and evolution-data only (EVDO) wireless communication standards, and the second wireless communication system is a wireless communication system supporting a long term evolution (LTE) wireless communication standard.

* * * * *